United States Patent
Ishikawa

(12) United States Patent (10) Patent No.: US 6,898,242 B2
(45) Date of Patent: May 24, 2005

(54) MOVING PICTURE HIGH-SPEED CODER AND MOVING PICTURE HIGH-SPEED CODING METHOD

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 704 days.

(21) Appl. No.: 09/964,202

(22) Filed: Sep. 26, 2001

(65) Prior Publication Data

US 2002/0037050 A1 Mar. 28, 2002

(30) Foreign Application Priority Data

Sep. 27, 2000 (JP) ........................................ 2000-293234

(51) Int. Cl.[7] .............................................. H04N 7/12
(52) U.S. Cl. .............................. 375/240.13; 375/240.16
(58) Field of Search ......................... 375/240.13, 240.16

(56) References Cited

U.S. PATENT DOCUMENTS

| 5,689,307 A | * | 11/1997 | Sugahara et al. | ........ 348/419.1 |
| 5,963,673 A | * | 10/1999 | Kodama et al. | ........... 382/239 |
| 6,408,029 B1 | * | 6/2002 | McVeigh et al. | ...... 375/240.13 |
| 6,625,214 B1 | * | 9/2003 | Umehara et al. | ...... 375/240.12 |

FOREIGN PATENT DOCUMENTS

| JP | 3-220887 | 9/1991 |
| JP | 6-54315 | 2/1994 |
| JP | 10-155149 | 6/1998 |

* cited by examiner

*Primary Examiner*—Chris Kelley
*Assistant Examiner*—Patrick Cathey, II
(74) *Attorney, Agent, or Firm*—Scully, Scott, Murphy & Presser

(57) ABSTRACT

When all frames, which are used for reference, are stored, vector retrieval means 13 find correlation with a reference frame. Compression type determination means 14 compare a predictive error of the found vector position and an average deviation within the frame, and select the compression type with high compression efficiency. Compression mode determination means 15 select anyone of the compression process at the time of the high-speed mode and the compression process at the time of the normal mode based on the compression type. In the compression process at the time of the high-speed mode, for the macro block the difference between it and the predictive block is not taken in motion predictive means 16, it is converted into a frequency component in frequency conversion means 17, is quantized in quantization means 18, and is coded by the compression in variable-length coding means 23 to output the compression code from output means 24.

10 Claims, 5 Drawing Sheets

MOVING PICTURE HIGH-SPEED CODER AND MOVING PICTURE HIGH-SPEED CODING METHOD

BACKGROUND OF THE INVENTION

The present invention relates to a moving picture high-speed coder and a moving picture high-speed coding method, and more particularly, to high-speed processing by a picture compression unit that executes an inter-frame predictive coding.

In the picture compression unit that executes an inter-frame predictive coding, there is the method of finding a difference between a part and the part having highest correlation therewith to lessen data volume to be coded as effective means in order to improve picture quality.

Wider is a range of vector retrieval, more precise retrieval can be carried out, but the processing volume increases drastically. In general, in case that a high-speed compressing process is required, the method is employed of decreasing the operational volume by narrowing this retrieval range and by aborting the retrieval when the part having relatively high correlation was found. This method was disclosed in JP-A-271514/1998.

However, in these methods, the problem exists: In case that the part having high correlation can not be found in the retrieval range like a scene with violent motion, not only a compression speed becomes late because the operational volume increases the most, but also it finally becomes more efficient in coding that an intra-frame compression is carried out.

Also, in JP-A-155149/1998 is described the technique of coding by altering a frame rate in a terminal according to processing capacity, but the problem exists that a smooth regenerative picture became impossible to obtain when the frame rate is altered.

SUMMARY OF THE INVENTION

Accordingly, the objective of the present invention is to solve the above-mentioned tasks.

Moreover, the objective of the present invention is to provide a moving picture high-speed coder and a moving picture high-speed coding method that can carry out a high-speed compression in a scene with the violent motion.

Another objective of the present invention is to provide a moving picture high-speed coder and a moving picture high-speed coding method that can decrease error operations caused by an influence of flash and so forth in the moving picture coding process.

The moving picture high-speed coder in accordance with the present invention, which is a moving picture high-speed coder that executes an inter-frame predictive coding for the moving picture, comprises: vector retrieval means that detect a motion vector by a macro block unit among subject pictures that were input to find a predictive macro block with the highest compression efficiency; and compression type determination means for determining whether the macro block found in said vector retrieval means is an intra-frame coding or an inter-frame coding, and is adapted to carry out only the intra-frame compression when the optimum predictive vector can not be found in said compression type determination means, and the coding efficiency remains unchanged even though the intra-frame compression and fixation were carried out for the entirety of the frames.

Another moving picture high-speed coder in accordance with the present invention is adapted to compress all macro blocks with said intra-frame coding, only in case that, in the above-mentioned arrangement, the number of the macro blocks determined continuously as said intra-frame coding in frames, of which the number is optional but more than two, exceeded a threshold.

The moving picture high-speed coding method in accordance with the present invention, which is a moving picture high-speed coding method of executing an inter-frame predictive coding for the moving picture, comprises the steps of: detecting a motion vector by a macro block unit among subject pictures that were input to find a predictive macro block with the highest compression efficiency; and determining whether the macro block found in said vector retrieval means is an intra-frame coding or an inter-frame coding, and is adapted to carry out only the intra-frame compression when the optimum predictive vector can not be found in said compression type determination means and the coding efficiency remains unchanged even though the intra-frame compression and fixation were carried out for the entirety of the frames.

Another moving picture high-speed coding method in accordance with the present invention is adapted to compress all macro blocks with said intra-frame coding, only in case that, in the above-mentioned steps, the number of the macro blocks determined continuously as said intra-frame coding in frames, of which the number is optional but more than two, exceeded a threshold.

Namely, the moving picture high-speed coder in accordance with the present invention, which is a moving picture coder that executes the predictive coding for the moving picture, is for providing an arrangement that avoids the situation that the compressing process becomes impossible to perform within a unit time due to increasing in the operational volume of a motion prediction section.

As to the method of determining a vector value for motion prediction, in general, the technique is employed of finding a predicative error (sum of absolute value of a difference, or square and sum of the difference) between the current frame and a reference frame by the macro block unit to set a position with most less predicative error within the retrieval range at the motion vector of its macro block.

Also, as to the technique of decreasing the operational volume that is spent for the retrieval of the motion vector, the method is generally employed of, when the predicative error became less than a certain value, finishing the retrieval process, however in this method, in case that the motion is large within a screen, position, in which the predicative error becomes small, becomes impossible to find, and the retrieval process can not be aborted halfway, thereby the operational volume of the retrieval becomes bulky.

More specifically, in the moving picture high-speed coder of the present invention, the vector retrieval means detect the motion vector by the macro block unit among the subject pictures that were input to find the predicative macro block with the highest compression efficiency, compression type determination means determine the intra-frame coding or the inter-frame coding, if the number of the macro blocks a frame determined as the intra-frame coding exceeds the threshold, all macro blocks are compressed with the intra-frame coding until the same determination is made again at the time of compressing the next key frame.

As mentioned above, when it is more efficient in the compression to execute the intra-frame coding due to the violent motion, by omitting the retrieval process to do away with execution of the predicative coding, a drop in the processing speed due to increasing in the operational volume of the motion retrieval can be suppressed, thereby the compression without dropping of the scene becomes possible.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Figure 1:
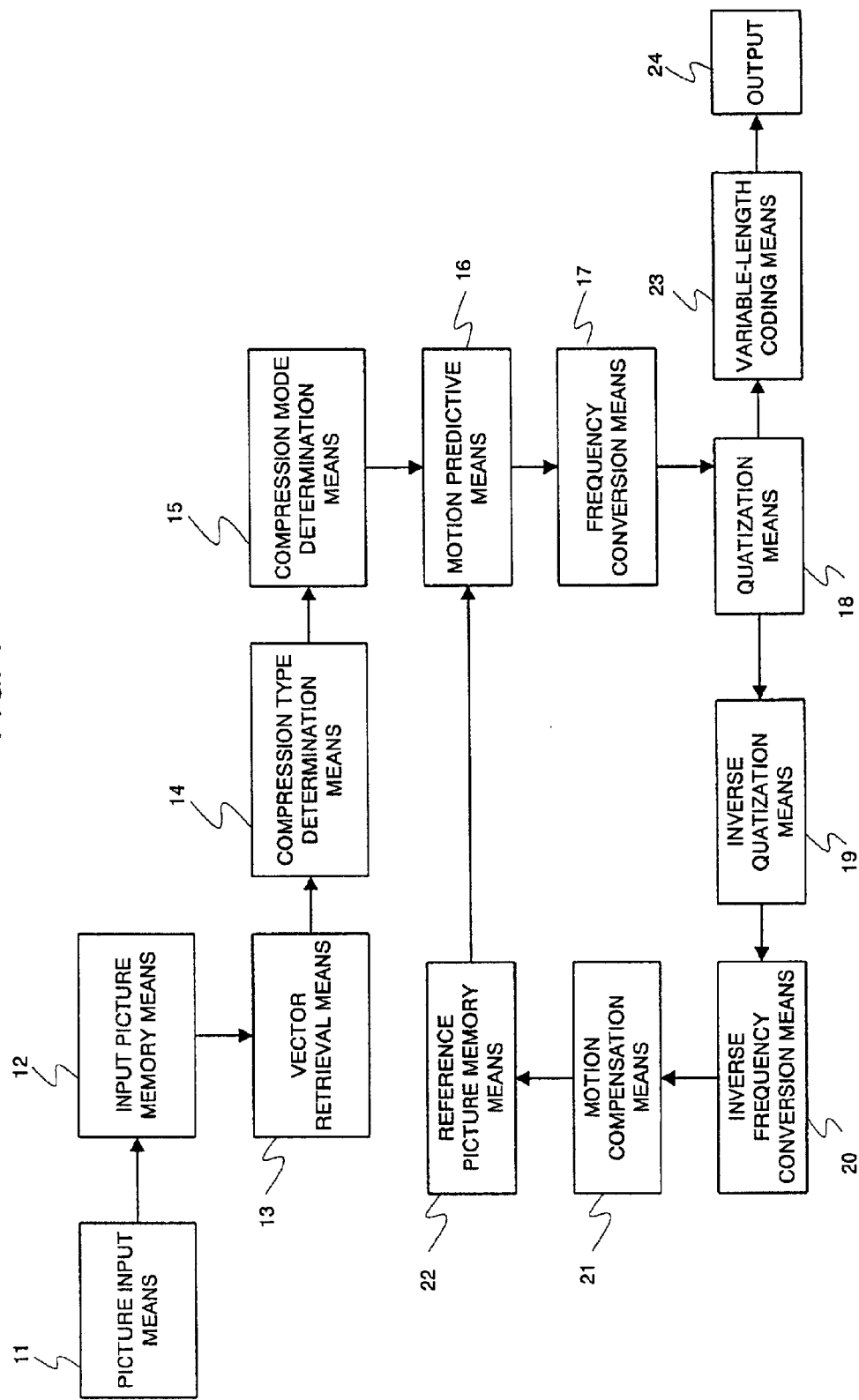
FIG. 1 is a block diagram illustrating an arrangement of a moving picture high-speed coder in accordance with one embodiment of the present invention.

Next, one embodiment of the present invention will be explained, referring to the accompanied drawings. FIG. 1 is a block diagram illustrating an arrangement of a moving picture high-speed coder in accordance with one embodiment of the present invention. In FIG. 1, a moving picture high-speed coder in accordance with one embodiment of the present invention is constructed of picture input means 11, input picture memory means 12, vector retrieval means 13, compression type determination means 14, compression mode determination means 15, motion predication means 16, frequency conversion means 17, quantization means 18, inverse quantization means 19, inverse frequency conversion means 20, motion compensation means 21, reference picture memory means 22, variable-length coding means 23, and output means 24.

When the picture from a camera and so forth, which are not shown in FIG. 1, is incorporated by one frame unit by the picture input means 11, the input picture memory means 12 temporarily store its image. When all frames, which are used for a reference in the input picture memory means 12, are stored, the vector retrieval means 13 find correlation with the reference frame. The vector retrieval means 13 find predicative errors within a certain retrieval range by the macro block unit, and set a vector to a location with fewest predicative errors at a predicative vector.

The compression type determination means 14 compare the predicative error of the vector position found in the vector retrieval means 13 and a mean deviation within the frame, and select the compression type with high compression efficiency. The compression mode determination means 15 select anyone of the compression process at the time of a high-speed mode and the compression process at the time of a normal mode, based on the compression type selected in the compression type determination means 14.

If the number of the macro blocks of the intra-frame coding is less than the threshold, the compression mode determination means 15 select the normal-mode compression process in which the macro blocks of the intra-frame coding and the inter-frame coding mixed. In this case, for the macro block of the inter-frame coding, the difference between it and the predicative block is taken in the motion predicative means 16, for the macro block of the intra-frame coding, the difference between it and the predicative block is not taken in the motion predicative means 16, but it is converted into a frequency component in the frequency conversion means 17 and is quantized in the quantization means 18. For the quantized macro block is carried out the compression coding by the variable-length coding means 23, which is output from the output means 24.

Also, in order to prepare the reference frame for the next frame compression, for the result brought by the quantization means 18, the inverse quantization is carried out in the inverse quantization means 19, which is converted from the frequency component into the picture component in the inverse frequency conversion means 20, data of the reference frame is prepared in the motion compensation means 21, and its data is stored in the reference picture memory means 22.

If the number of the macro blocks of the intra-frame coding is more than the threshold, the compression mode determination means 15 select the high-speed mode compression process that compresses all macro blocks with the intra-frame coding. In this case, for the macro block, the difference between it and the predicative block is not taken in the motion predicative means 16, but it is converted into the frequency component in the frequency conversion means 17, is quantized in the quantization means 18 and is coded with the compression in the variable-length coding means 23 to output the compression code from the output means 24. Herein, what is called the threshold, for example, is 70 percent value and so forth of the number of the macro blocks of one frame.

Figure 2:
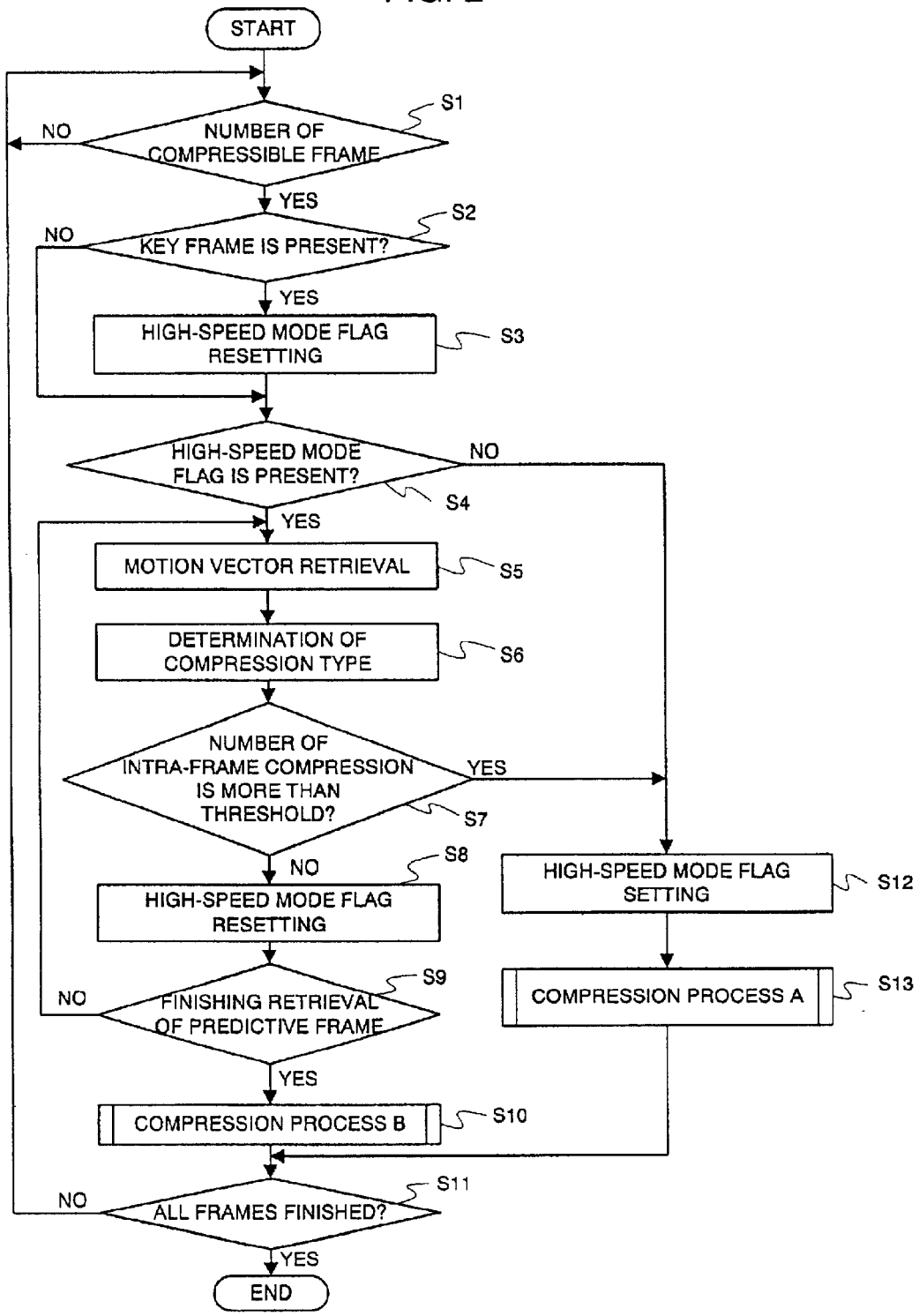
FIG. 2 is a flowchart illustrating an operation of a moving picture high-speed coder in accordance with one embodiment of the present invention.
Figure 3:
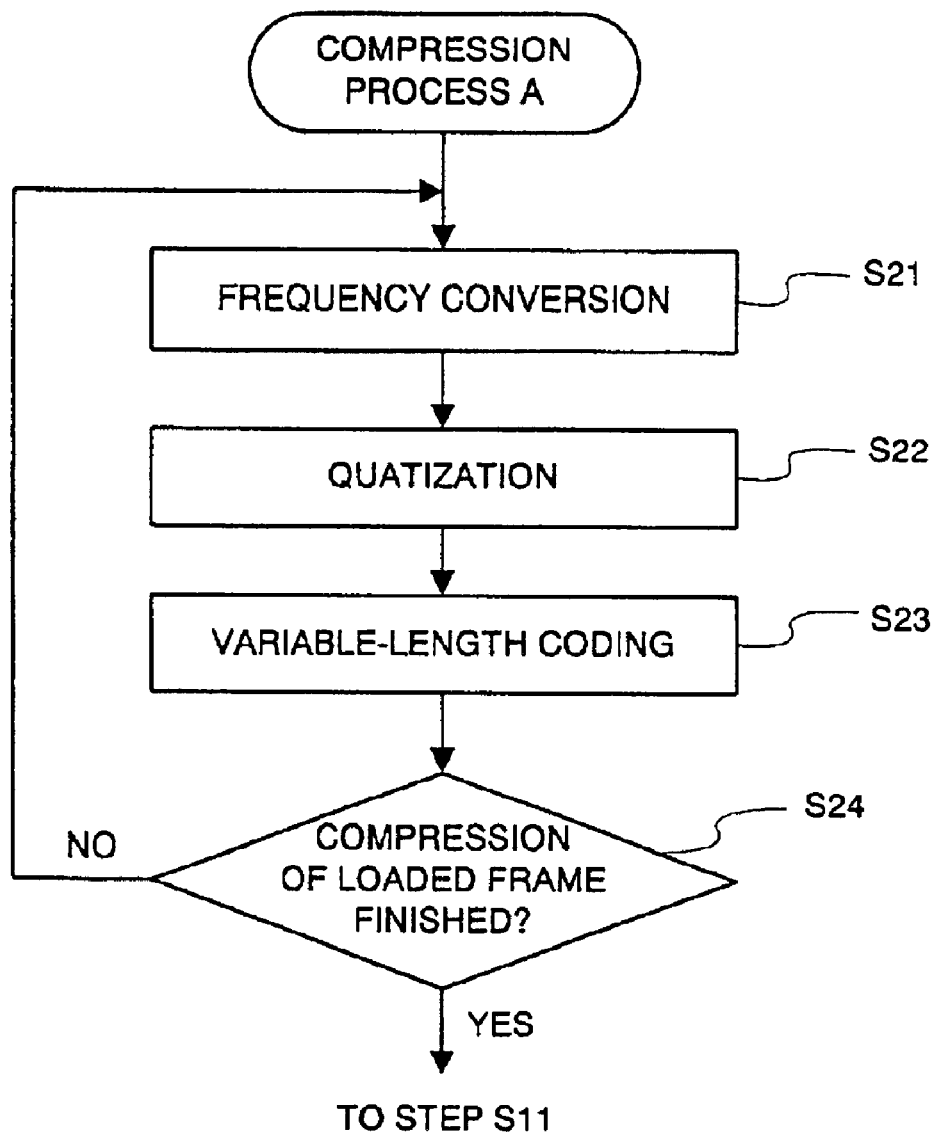
FIG. 3 is a flowchart illustrating a processing operation of a compression process A of FIG. 2.
Figure 4:
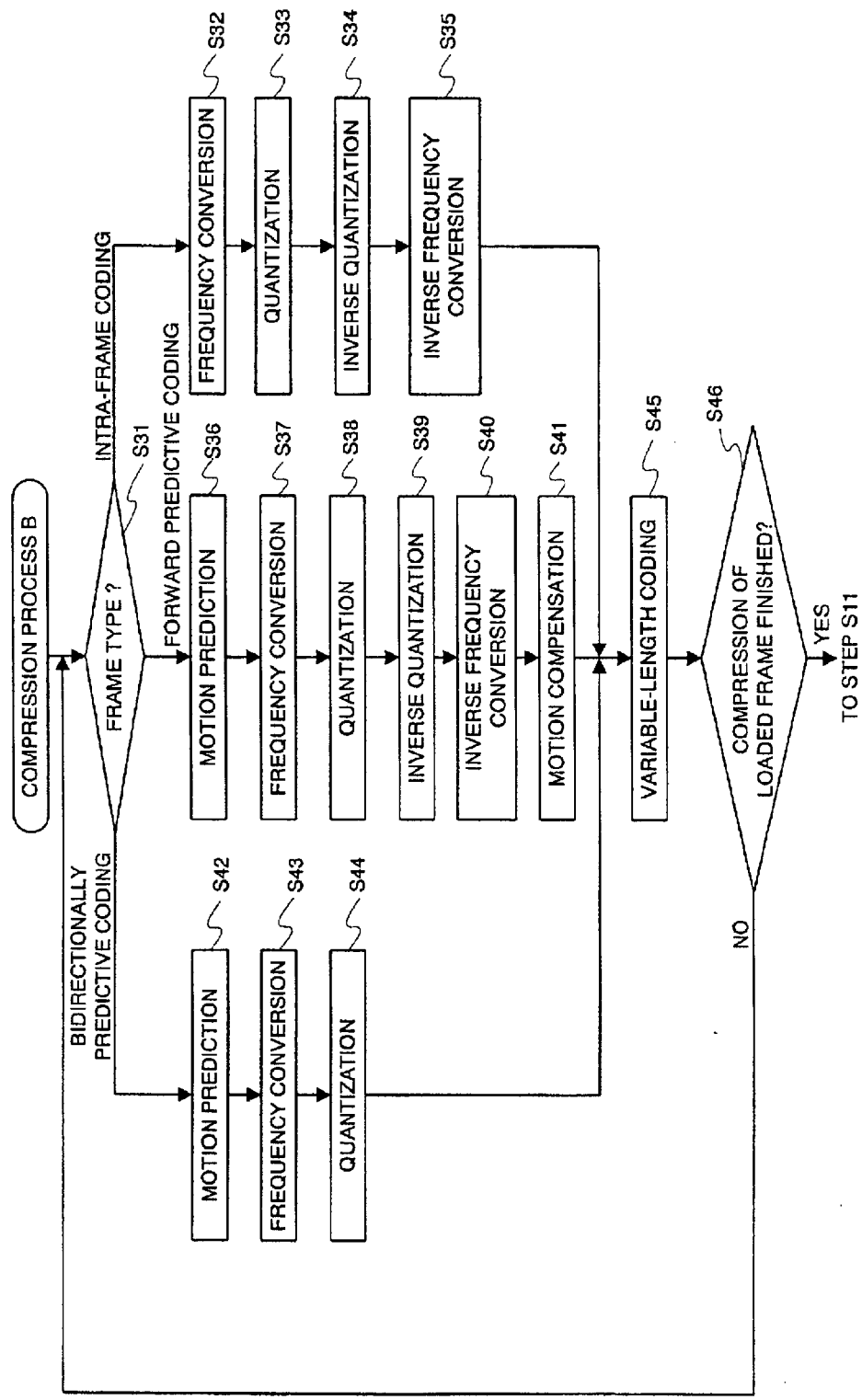
FIG. 4 is a flowchart illustrating a processing operation of a compression process B of FIG. 2.

FIG. 2 is a flowchart illustrating an operation of a moving picture high-speed coder in accordance with one embodiment of the present invention, FIG. 3 is a flowchart illustrating a processing operation of a compression process A in FIG. 2, and FIG. 4 is a flowchart illustrating a processing operation of a compression process B in FIG. 2. Referring to these FIG. 1 to FIG. 4, an operation of a moving picture high-speed coder in accordance with one embodiment of the present invention will be explained.

When the picture data is input from the picture input means 11, the input picture memory means 12 carries out buffering until the frames such as the reference picture and so forth necessary for the compression become complete (FIG. 2, step S1). When a compressible minimum number of the frame is input, the vector retrieval means 13 check whether the key frame (intra-frame-coded frame) is present therein (FIG. 2, step S2).

When the key frame was found, the vector retrieval means 13 reset a high-speed mode flag (FIG. 2, step S3). Also, if the high-speed mode flag was not raised at this moment (FIG. 2, step S4), the vector retrieval means 13 do not perform a detection process for the motion vector, and the intra-frame compression process is performed (FIG. 2, step S12 and step 13).

If the high-speed mode flag was raised (FIG. 2, step S4), the vector retrieval means 13 carry out the retrieve for the motion vector (FIG. 2, step S5). The retrieval of the motion vector by the vector retrieval means 13 is carried out among the subject pictures, and the location, in which the predicative error becomes smallest within a specific range, is detected.

The compression type determination means 14 compare its minimum predicative error and the mean deviation within the frame to determine the compression type of each macro block (FIG. 2, step S6). The compression mode determination means 15 compare the number of the macro blocks determined as the intra-frame compression in one frame by the compression type determination means 14, and the threshold, if the number of the macro blocks of the intra-frame compression is more than the threshold (FIG. 2, step S7), it raises the high-speed mode flag to proceed to the high-speed mode compression process A (FIG. 2, step S12 and S13).

To the contrary, if the threshold is more, the compression mode determination means 15 reset the high-speed mode flag (FIG. 2, step S8). The compression process A at the time of the high-speed mode is illustrated in FIG. 3.

Namely, in the compression process A at the time of the high-speed mode, for each frame, the predicative coding is not executed during the high-speed mode, the frequency conversion is made in the frequency conversion means 17 (FIG. 3, step S21), the quantization is carried out in the quantization means 18 (FIG. 3, step S22), the variable-length coding is executed in the variable-length coding means 23 (FIG. 3, step S23). In this high-speed mode compression process A, the process is repeated until all loaded frames are compressed (FIG. 3, step S24).

In case of performing the compression process B at the time of the normal mode, the processes following the motion vector retrieval are performed for all frames to be predicted (FIG. 3, step S10). The compression process B at the time of the normal mode is illustrated in FIG. 4.

Namely, in the compression process B at the time of the normal mode, when the predicative vector and the compression type were determined, the compression is carried out for each frame type (FIG. 4, step S31). In case that the frame type is an intra-frame coded frame, since only the intra-frame coding exists, and yet it becomes a reference frame, the frequency conversion is made in the frequency conversion means 17 (FIG. 4, step S32), the quantization is carried out in the quantization means 18 (FIG. 4, step S33), the inverse quantization is carried out in the quantization means 19 (FIG. 4, step S34), the inverse frequency conversion is made in the inverse frequency conversion means 20 (FIG. 4, step S35), and the variable-length coding is executed in the variable-length coding means 23 (FIG. 4, step S45).

In case that the frame type is a forward predicative-coded frame, since the inter-frame coding and the inner-frame coding mix and yet it becomes a reference frame, the motion prediction is made in the motion predicative means 16 (FIG. 4, step S36), the frequency conversion is made in the frequency conversion means 17 (FIG. 4, step S37), the quantization is carried out in the quantization means 18 (FIG. 4, step S38), the inverse quantization is carried out in the quantization means 19 (FIG. 4, step S39), the inverse frequency conversion is made in the inverse frequency conversion means 20 (FIG. 4, step S40), the motion compensation is carried out in the motion compensation means 21(FIG. 4, step S41),and the variable-length coding is executed in the variable-length coding means 23 (FIG. 4, step S45).

In case that the frame type is a bidirectionally predicative coded frame, since the inter-frame coding and the intra-frame coding mix and yet it does not become a reference frame, the motion prediction is made in the motion predicative means 16 (FIG. 4, step S42), the frequency conversion is made in the frequency conversion means 17 (FIG. 4, step S43), the quantization is carried out in the quantization means 18 (FIG. 4, step S44), and the variable-length coding is executed in the variable-length coding means 23 (FIG. 4, step S45). This normal-mode compression process B is repeated until all loaded frames are compressed (FIG. 4, step S46). The processes mentioned above are repeated until the compression of all frames is completed (FIG. 2, step S11).

Figure 5:
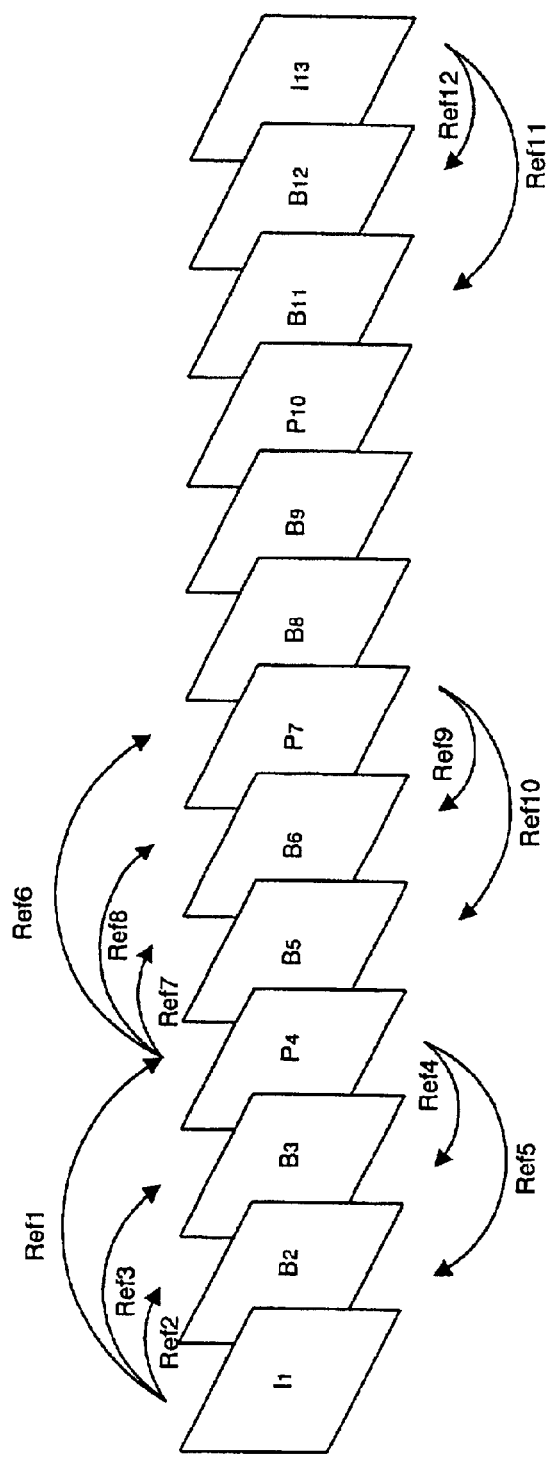
FIG. 5 is a view illustrating an operation of a moving picture high-speed coder in accordance with one embodiment of the present invention.

FIG. 5 is a view illustrating an operation of a moving picture high-speed coder in accordance with one embodiment of the present invention. In FIG. 5, a frame arrangement of MPEG (Moving Picture Experts Group) 1 is illustrated.

With regard to the frame type, there are three types of frames, an I frame that does not make prediction (Intra-coded picture), a P frame that makes the prediction from the past information (predictive-coded picture), and a B frame that makes the prediction from the past/future information (bidirectionally predictive picture). In this example, a minimum number of the frames necessary for the compression is four frames ranging from the frame that becomes a reference frame to the next reference frame, which are [I, B, B, P] or [P, B, B, P].

In the compression of the [I, B, B, P] part in FIG. 5, the retrieval of the predictive vector is carried out from Ref 1 to Ref 5, and the coding is executed in order of I1, P4, B2, and B3. The intra-frame coding is executed for I1, and a decoding process for preparing the reference frame is also performed. For P4, the predictive coding is executed by taking the difference between it and the decoded reference frame of I1 using the predictive vector found previously. Since P4 also becomes a reference frame, the decoding process is performed for it. For B2 and B3, by taking the difference between them and the decoded pictures of I1 and P4 respectively using the predictive vector found previously, the predictive coding is also carried out. Since the B frame does not become a reference picture, the decoding process is not performed.

In a similar way to the foregoing, the compression process also is to be performed for B5, B6, and P7, but suppose that it was determined from the result of the prediction of B6 (Ref 8 and Ref 9) that the number of the macro blocks with high compression efficiency was more than the threshold when the intra-frame coding was executed. Since P4 has already been coded, the high-speed mode is applied for the frames following B5, and the P frame just before the compression unit, in which the I frame is able to become a reference frame next, in this case, is P10. Namely, all B5 to P10 are compressed with intra-frame coding, without decoding for preparing the predictive frame.

Since the I frame is contained in the compression unit of B11, B12, and I13, herein determination is made as to the normal mode or the high-speed mode again. However, since the reference frame was not been prepared for P10 that was already compressed, the reference of B11 and B12 becomes only Ref 11 and Ref 12 from I13.

Herein, since, if the number of the macro blocks with high compression efficiency is less than the threshold when the intra-frame coding is executed, the compression is carried out in the normal mode, the intra-frame coding is executed for I13, and the decoding process for the reference frame is performed. The predictive-coding is executed for B11 and B12 by taking the difference between them and the decoded reference frame of I13, using the predictive result found in the Ref 11 and the Ref 12. Also, if determination is made as the high-speed mode again, the compression is continued until the next I frame is contained in the compression unit.

Now, herein determination of the high-speed mode is being made, based on the number of the macro blocks of the intra-frame coding of one frame out of the predictive frames, but, in order to avoid an influence of flash and scene change of the picture, only in case of having continuously exceeded the threshold in frames, of which the number is optional but more than two, it may be allowed to proceed to the high-speed mode.

Like this, in case of compressing the picture with many motions exceeding the retrieval range of the motion vector, by executing the intra-frame coding for all frames without execution of the predictive coding, the operation necessary for the preparation of the reference frame and the vector retrieval can be omitted, thereby the high-speed compression can be carried out for the scene with the violent motion.

Also, by enhancing determination precision as to whether the large motion is present in the scene, in consideration of the predictive result of a plurality of frames, in the above-mentioned moving picture coding process, the error operation caused by an influence of the flash and so forth can be reduced.

As explained above, in accordance with the moving picture high-speed coder of the present invention, an advantage exists: In the moving picture high-speed coder that executes the inter-frame predictive coding for the moving picture, by detecting the motion vector by the macro block unit among the subject pictures that were input to find the predictive macro block with the highest compression efficiency, by determining whether its found macro block is the intra-frame coding or the inter-frame coding, and when the optimum predictive vector can not be found at the time of its determination and the coding efficiency remains unchanged even though the intra-frame compression and fixation was carried out for the entirety of the frame, by carrying out only the intra-frame compression, the high-speed compression can be carried out in the scene with the violent motion.

Also, in accordance with another moving picture high-speed coder of the present invention, an advantage exists: Only in case that the number of the macro blocks determined continuously as the intra-frame coding in frames, of which the number is optional but more than two, exceeded the threshold, by compressing all macro blocks with the intra-frame coding, the error operation caused by an influence of the flash and so forth can be reduced in the moving picture coding process.

The entire disclosure of Japanese Application No. 2000-293234 filed Sep. 27, 2000 including specification, claims, drawings and summary are incorporated herein by reference in its entirely.

What is claimed is:

1. A moving picture high-speed coder that executes an inter-frame predictive coding for a moving picture, comprises:
   vector retrieval means that detect a motion vector by a macro block unit among subject pictures that were input to find a predictive macro block with highest compression efficiency; and
   compression type determination means for determining whether said macro block found in said vector retrieval means is an intra-frame coding or an inter-frame coding, wherein, when said optimum predictive vector can not be found in a compression type determination means and coding efficiency remains unchanged even though intra-frame compression and fixation was carried out for entirety of a frame, only intra-frame compression is carried out.

2. The moving picture high-speed coder according to claim 1, wherein, if number of said macro blocks one frame, which were determined as said intra-frame coding in said compression type determination means, is more than a threshold, until same determination is made again at moment of compressing a next key frame indicating said intra-frame coding, all macro blocks are compressed with said intra-frame coding.

3. The moving picture high-speed coder according to claim 2, wherein, only in case that number of said macro blocks determined continuously as said intra-frame coding in frames, of which number is optional but more than two, exceeded a threshold, all macro blocks are compressed with said intra-frame coding.

4. The moving picture high-speed coder according to claim 1, wherein, at time of carrying out only said intra-frame compression, said inter-frame predictive coding is not executed to omit a reference frame preparation process.

5. The moving picture high-speed coder according to anyone of claim 1, wherein, in case of carrying out only said intra-frame compression, only when a turn came of compressing a key frame indicating said intra-frame coding, said predictive vector is found to determine whether or not only said intra-frame compression is continued.

6. A moving picture high-speed coding method that executes an inter-frame predictive coding for a moving picture, comprises steps of:
   detecting a motion vector by a macro block unit among subject pictures that were input to find a predictive macro block with highest compression efficiency; and
   determining whether its found macro block is an intra-frame coding or an inter-frame coding, wherein, when an optimum predictive vector can not be found at moment of determining said intra-frame coding or said inter-frame coding and coding efficiency remains unchanged even though intra-frame compression and fixation is carried out for entirety of a frame, only intra-frame compression is carried out.

7. The moving picture high-speed coding method according to claim 6, wherein, at moment of determining said intra-frame coding or said inter-frame coding, if number of said macro blocks a frame, which were determined as said intra-frame coding in said compression type determination means, is more than a threshold, until same determination is made again at moment of compressing a next key frame indicating said intra-frame coding, all macro blocks are compressed with said intra-frame coding.

8. The moving picture high-speed coding method according to claim 7, wherein, only in case that number of said macro blocks determined continuously as said intra-frame coding in frames, of which umber is optional but more than two, exceeded a threshold, all macro blocks are compressed with said intra-frame coding.

9. The moving picture high-speed coding method according to claim 6, wherein, in case of carrying out only said intra-frame compression, said intra-frame predictive coding is not executed to omit a reference frame preparation process.

10. The moving picture high-speed coding method according to claim 6, wherein, in case of carrying out only said intra-frame compression, only when a turn came of compressing a key frame indicating said intra-frame coding, said predictive vector is found to determine whether or not only said intra-frame compression is continued.

* * * * *